UNITED STATES PATENT OFFICE.

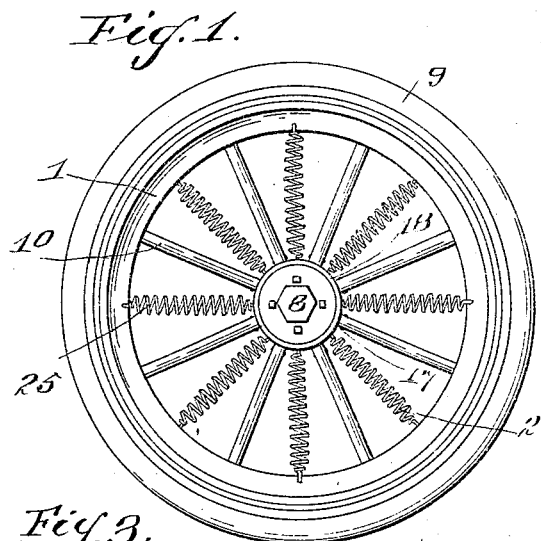
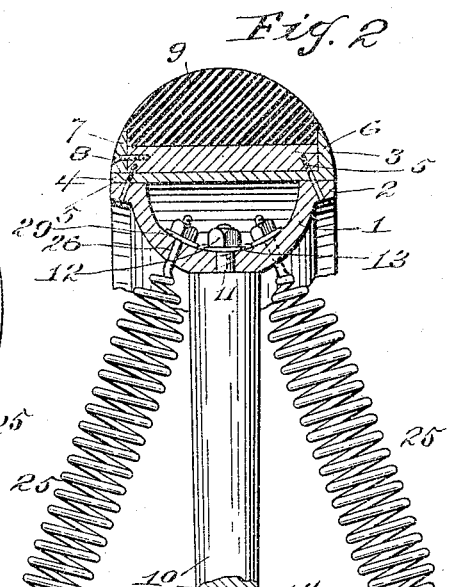
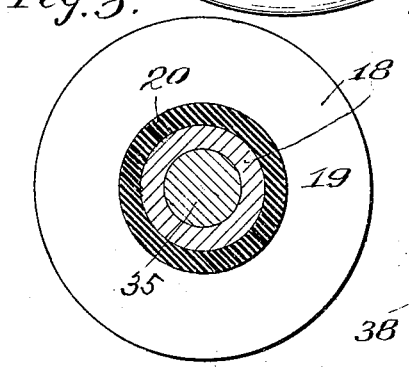
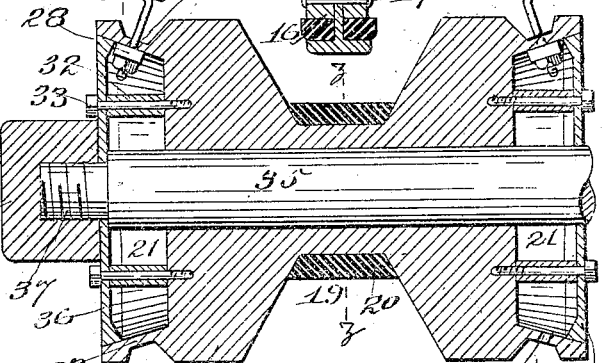
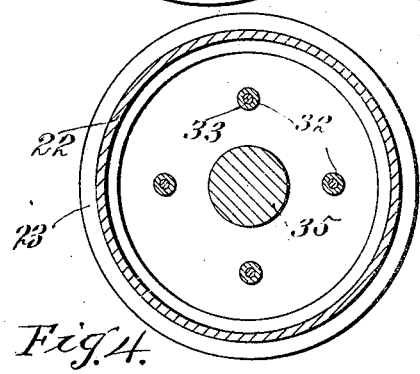

SAMUEL P. SANDERS, OF AURORA, NEBRASKA, ASSIGNOR OF ONE-HALF TO CHRISTIAN C. GROSSHANS, OF AURORA, NEBRASKA.

SPRING-WHEEL.

1,017,919. Specification of Letters Patent. Patented Feb. 20, 1912.

Application filed August 18, 1910. Serial No. 577,744.

*To all whom it may concern:*

Be it known that I, SAMUEL P. SANDERS, a citizen of the United States, residing at Aurora, in the county of Hamilton and State of Nebraska, have invented certain new and useful Improvements in Spring-Wheels, of which the following is a specification.

This invention relates to vehicle wheels, and pertains especially to spring wheels and manner of making the same and their hubs, and rims.

The object of the invention is to provide in a spring wheel specially adaptable for automobiles, certain novel and peculiar construction of the wheel hub and the rim.

A further object of the invention is to provide such novel and peculiar connections and combination of parts as will produce a spring wheel of an improved type, and of such durability that it will overcome many of the objections and disadvantages of other spring wheels.

A still further object of the invention is to provide novel and peculiar means for interposing spiral springs between the hub and the rim.

Various other objects, advantages and improved results are attainable through and by the construction and arrangement of parts will hereinafter be described and set up in the appended claim.

In the accompanying drawings forming part of this application:—Figure 1 is a side elevation of a wheel embodying the invention. Fig. 2 is an enlarged sectional view, partly broken away. Fig. 3 is a sectional view taken on the line z—z Fig. 2. Fig. 4 is a similar view taken on the line y—y Fig.
2. Fig. 5 is a detail elevation of a spring spoke, partly broken away, and its mountings for attaching it.

The same reference numerals denote the same parts throughout the several views of the drawings.

The wheel now to be described is especially designed for automobiles, and is illustrated in the drawings as such, but obviously it may be used on other vehicles if desired, and the wheel is so constructed that it may be operated either as a driving wheel or an idle wheel carried by the automobile.

The tire rim 1, of the wheel is concaved upon its inner side, and has lateral peripheral flanges 2, to which is secured a plate-ring 3, and a partition plate-ring 4, by means of screw bolts 5, extending through the said flanges and through the ring 4, and screwing into the body of the ring 3. The ring 4 is provided on one edge with an annular flange 6, and the other edge of this ring has fitted to it a similar removable flange 7 secured in place by set screws 8. These flanges extend beyond the ring 3 and over-lap a solid or other rubber tire 9, and impinge the latter so as to hold it on the ring 3. It is obvious that tires of various thickness and elasticity may be applied as desired or according to the character of the road-bed over which the vehicle is propelled. To the rim 1 is secured a series of spokes 10, which have a screw stud 11, fitting apertures in the rim and secured thereto by nuts 12, having a convex washer 13, between the nut and the rim.

The inner end of the spokes 10, has a slot 14, for rim flanges 15, which extend through a cushion ring 16, such flanges being secured in the slots by bolts or pins 17, for holding the rim and the ring in place.

The wheel-hub 18 has an annular central concavity 19, containing a body of rubber 20, forming a bumper or cushion for the bumper-ring 16, which contacts with the cushion or bumper 20, only when the road or street surface creates an uneven or rough travel of the vehicle, or upon over-loading the same. There being sufficient space between the bumper and the bumper-ring to permit ordinary vibration of the wheel without the engagement of the said ring and bumper. The ends of the hub are recessed so as to form a space 21, and the outer wall 22, of the recesses have an annular cut-out or angular groove 23, provided with holes 24, for one end of spiral spring spokes 25. The spokes are arranged in two sets one set for each end of the hub, and the spoke sets incline inwardly toward each other to the wheel rim 1, which has holes 26, adjacent the outer end or joining point of the spokes 10, and the rim, for the other end of the spring spokes. The spring spokes are composed of spring steel of such strength and elasticity as desired or as occasion may demand. The innermost coil of the springs may engage the hub groove 23, under heavy pressure. Each end of the spring spokes is provided with a boss or head 27, which fits a counter-sunk washer 28, in the recess 21, and a concaved counter-sunk washer 29, which fits within the rim 1, and the ends of these spokes are also provided with screw nuts 30 having securing pins or set screws 31.

Each end of the hub has a plurality of tubular projections or posts 32, for bolt-rods 33, having screw ends screwing into the body of the hub. Certain of said rods hold a cap plate 34 on the inner end of the hub and against the posts on this end of the hub, and the periphery of this plate fits within the inner recess 21, flush with this end of the hub, and the axle 35 extends through the plate 34. The outer end of the hub is closed by a plate 36 fitting the reduced end 37 of the axle 35, said plate being secured to the hub in the same manner as the other plate 34, and this end of the axle is provided with a cap-nut 38.

It is obvious that the mechanical construction of this wheel and the assembling of its parts may be varied for front and rear wheels as desired, without departing from the spirit of the invention.

It will be seen that the parts of the wheel may be expeditiously assembled, that the elasticity or resiliency of the wheel is enhanced owing to the various cushions provided therein, and that the spring spokes are augmented and relieved of too great weight or pressure thereon by the bumper device.

It will also be observed that the ends of the spring spokes are free to work in their bearings to the extent of their limitation by their end mountings, so that such ends may have slight lengthwise movement, in compressing and expanding the springs.

I do not wish to be understood as limiting myself to any particular material in the construction of this wheel or the various parts thereof nor do I confine myself to any special size or dimension of its parts.

Having thus described my invention what I claim as new and desire to secure by Letters Patent is:—

In a spring wheel, the combination, with a tread rim, an inner rim, and spokes rigidly connecting the rims, of a hub having an annular groove, a bumper secured in the groove, a bumper ring carried by the inner rim within the said groove with a space between the ring and the hub-bumper, and a series of spiral springs on each side of the spokes and forming the only connection between the hub and the tread rim.

In testimony whereof I affix my signature in presence of two witnesses.

SAMUEL P. SANDERS.

Witnesses:
Wm. C. Hockenbary,
J. H. Murphy.